United States Patent [19]

Swindler et al.

[11] 4,079,299
[45] Mar. 14, 1978

[54] POSITIONING CONTROL MEANS FOR MOTOR DRIVEN ROTARY TAP CHANGER

[75] Inventors: David Lee Swindler; Benjamin O'Neal Brooks, both of Franklin, Ohio

[73] Assignee: Square D Company, Park Ridge, Ill.

[21] Appl. No.: 611,101

[22] Filed: Sep. 8, 1975

[51] Int. Cl.² ............................................. G05B 11/14
[52] U.S. Cl. ................................. 318/261; 318/265; 318/467
[58] Field of Search ............... 318/261, 286, 265–267, 318/466, 467

[56] References Cited

U.S. PATENT DOCUMENTS

| | | | |
|---|---|---|---|
| 2,669,680 | 2/1954 | Wrenn | 318/261 X |
| 2,869,061 | 1/1959 | Pinney | 318/261 X |
| 3,617,837 | 11/1971 | Beck | 318/266 X |
| 3,914,676 | 10/1975 | Madonian et al. | 318/467 |
| 3,965,404 | 6/1976 | Petersen | 318/261 |

Primary Examiner—Robert K. Schaefer
Assistant Examiner—W. E. Duncanson, Jr.
Attorney, Agent, or Firm—Richard T. Guttman; Norton Lesser

[57] ABSTRACT

A rotary tap changer or switch is rotated by a motor to a plurality of contactor positions by a control system having a cam that rotates to activate limit switches respectively corresponding to contactor positions. The activation of the limit switches causes operation of a relay which, after a selected time delay, operates to discharge a capacitor across the motor to apply dynamic braking and stop the motor. When starting the motor to rotate the tap changer, energization is applied through the limit switches to select rotation in a forward or reverse direction determined with some modification by the shortest distance of rotation to the new selected position.

20 Claims, 6 Drawing Figures

POSITIONING CONTROL MEANS FOR MOTOR DRIVEN ROTARY TAP CHANGER

This invention relates to rotary tap switches or changers that are rotated by electric motors, and particularly relates to a means for controlling and positioning the contactors of the rotary changers.

In the operation of rotary tap switches or changers it is necessary to stop the rotating contactors at positions that make full electrical contact with the contact terminals. This has been generally accomplished in motor rotated changers by a plurality of limit switches placed in a concentric position about a shaft that are activated by cams to thereby produce an indication of the position of the contactors. The motor has been manually turned off to stop at the selected position. Since it is generally desirable, particularly in rotary switches having many contact positions, to be able to rotate the tap changer in both a clockwise and a counter-clockwise direction, it has been necessary to have two limit switches for each contact position. In these devices each limit switch was individually adjusted in position so that upon activation by the cam the motor could be de-energized to stop the contactors at the selected contact position. If automatic turning off was used the characteristics affecting rotation would be different in the two directions requiring that each of the limit switches be positioned and adjusted in both the clockwise and counter-clockwise rotation for each position of the contactors. The stopping of the motor to position the contactors was accomplished, typically manually by turning off the motor upon operation of a limit switch and applying mechanical braking.

With this invention a new control system for rotary tap switches substantially eliminates prior art problems, at least to the degree necessary for tap switches in general use, by eliminating the need for the two limit switches for each contactor position, by eliminating the general need for accurate adjustment of each of the limit switches individually, by eliminating the use of mechanical braking, and by providing for automatically selected rotation in a desired direction, usually the shortest distance of rotation, to the new, selected contactor position.

The objects and advantages of the invention will further appear from the following description of an embodiment of the invention.

Figure 1:
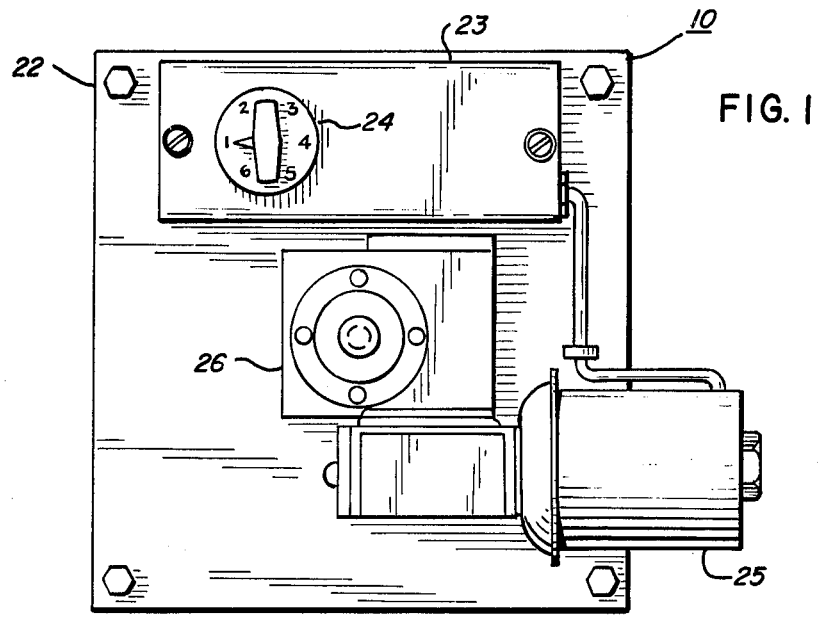
FIG. 1 is an end view of a motor driven rotary tap changer according to this invention.
Figure 2:
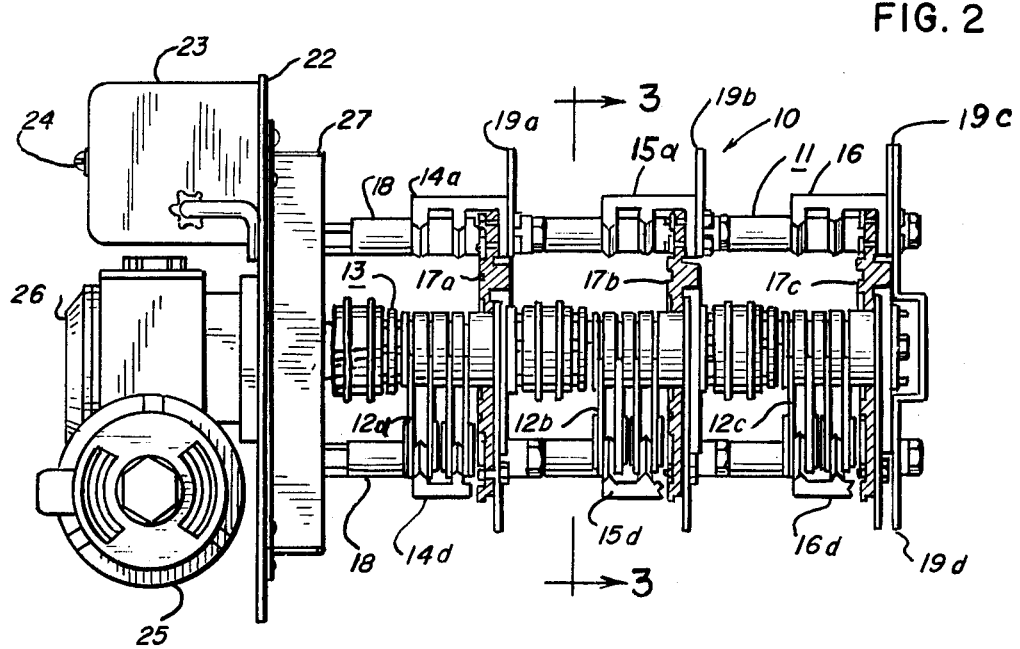
FIG. 2 is a simplified side view of the rotary tap changer shown in FIG. 1.
Figure 3:
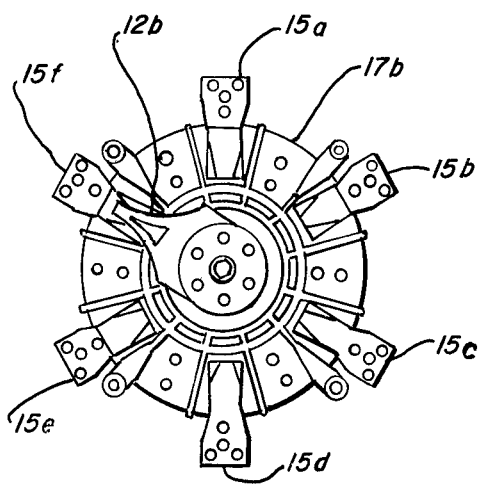
FIG. 3 is a simplified sectional end view with limited depth of a portion of a rotary tap changer shown in FIG. 1 taken along lines 3—3 of FIG. 1.

Referring to FIGS. 1, 2 and 3, a three phase rotary tap changer 10 comprises a main contact switching body 11 having contactors 12a, 12b and 12c connected to and mounted on a shaft assembly 13 that is rotatable to selectively position contactors 12a, 12b, and 12c, respectively, in contact with similar contact terminals 14a through 14f (partially shown) for one phase, 15a through 15f for another phase, and 16a through 16f (partially shown) for the third phase with one contact terminal portion for each portion of the rotary switch. The contactors are mounted on insulated support panels 17a, 17b and 17c, respectively, which are supported and connected by support and spacing rod assemblies 18. Three support plate assemblies 19a, 19b and 19c are connected to support panels 17a, 17b and 17c, respectively, and a back cover plate 19d is attached to support panel 17c.

Figure 6:
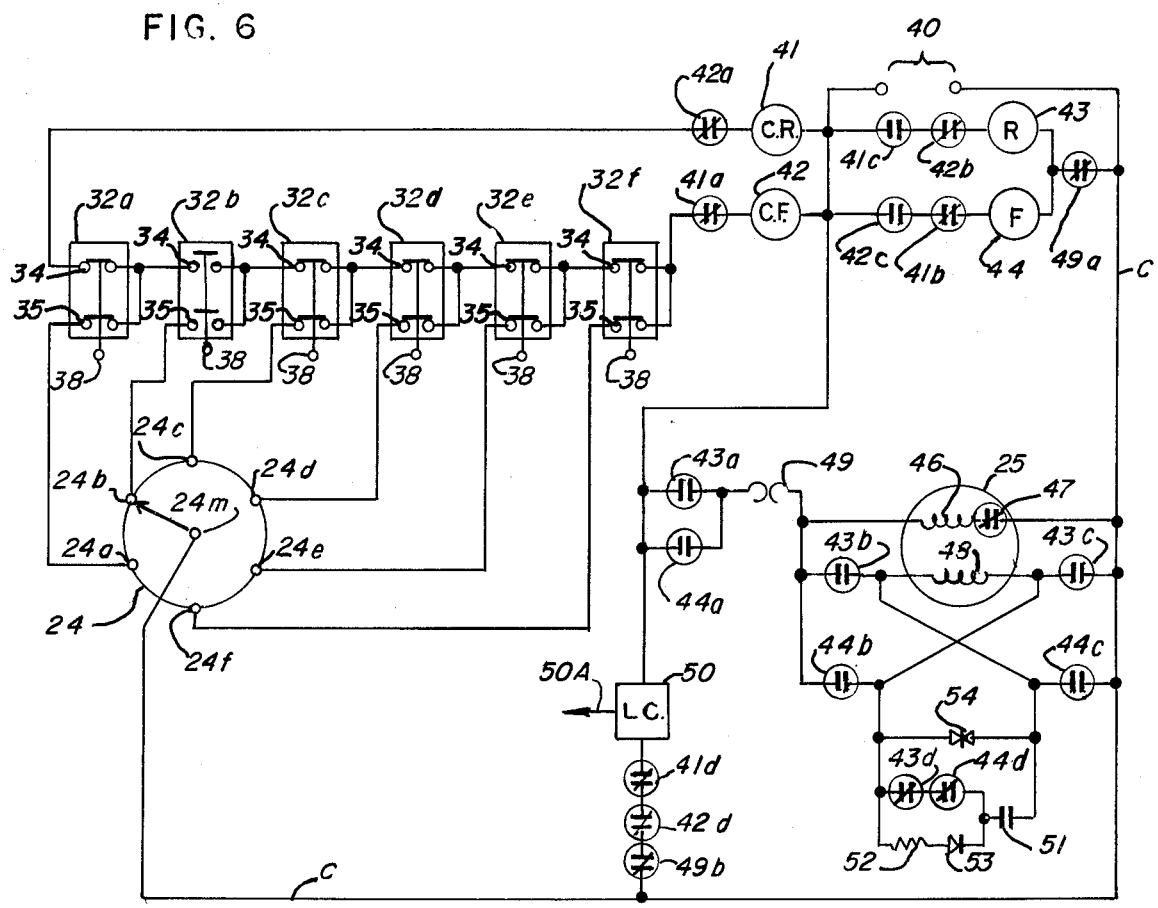
FIG. 6 is a schematic of the electrical portion of the control system for the motor and rotary tap changer.

Referring to FIGS. 1, 2, 4 and 5, an end plate 22 supports a control housing 23 containing the relays shown schematically in FIG. 6, a switch 24 for selecting the contactor positions, a motor 25, a speed reduction assembly and gear box 26 connected between the motor and the shaft assembly to rotate the shaft assembly, and an assembly cover 27. Control housing 23 and its contained component is shown in a exemplary location and could be located at a remote location such as a control center.

Figure 4:
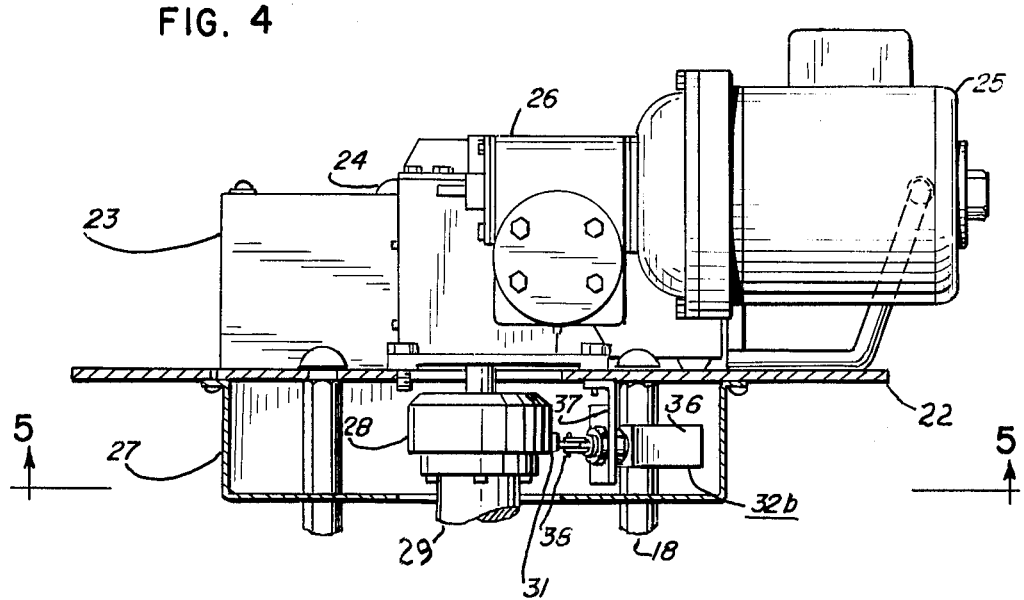
FIG. 4 is a bottom view of a portion of the rotary tap changer shown in FIG. 1 particularly showing one of the cam and limit switches with the other limit switches removed.
Figure 5:
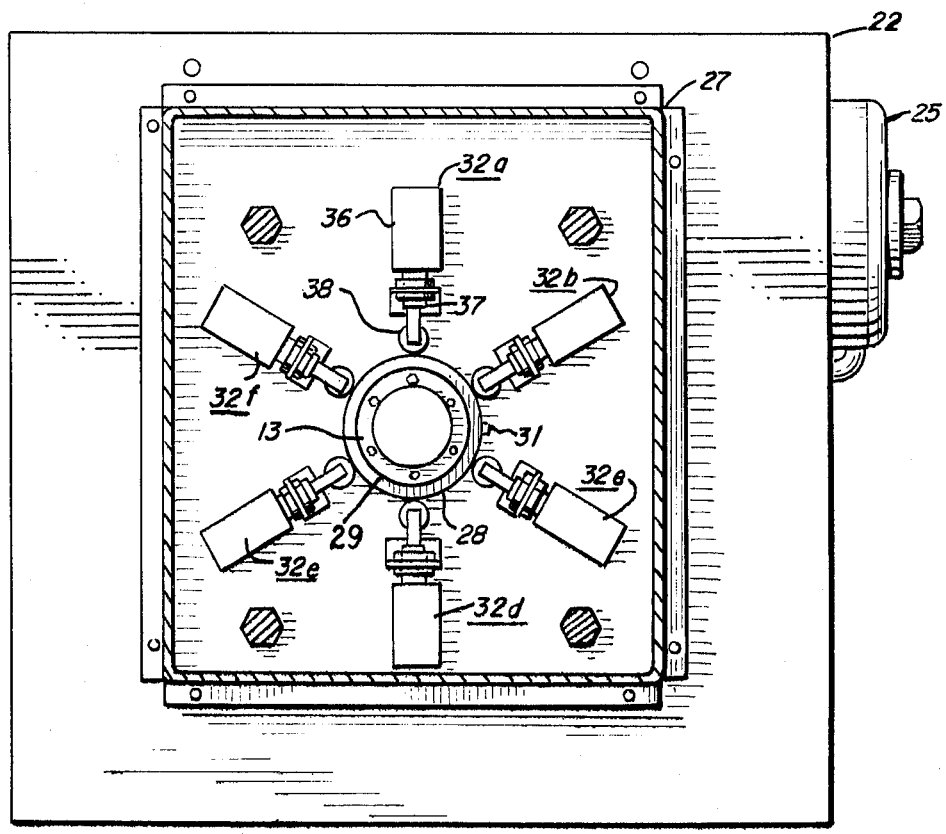
FIG. 5 is an end view of a portion of the rotary tap changer taken along lines 5—5 of FIG. 4.

Referring particularly to FIGS. 4 and 5, assembly cover 27 encloses an covers a connecting hub 28 connected to a shaft connector 29 that connects hub 28 to shaft assembly 13. A cam 31 is mounted on hub 28 and is positioned to engage limit switches 32a through 32f upon rotation of hub 28. In the embodiment shown there are six limit switches, one for each contactor position, mounted on end plate 22 that are engaged by and selectively switched by cam 31 upon rotation of hub 28 to move to an open position when cam 31 contacts a respective limit switch (as schematically shown in FIG. 6). Switches 32a through 32f each comprise a housing 36, a mounting bracket 37 used to mount each switch on plate 22, and a roller and shaft assembly 38 that transfers the motion provided by cam 31 to the contacts within the housing.

Referring to FIG. 6, the electrical circuit for operating the system is shown with the components mounted as in the description above or at any other suitable places known in the art on the rotary tap changer or adjacent equipment. A switch means for selecting a contact terminal position for the contactor comprises a rotary switch 24 which is manually rotatable through six positions and has a central contact 24m selectively connectable by rotation to respective contacts 24a through 24f. A sensing means for producing an indication signal when the contactor is at a selected distance from the selected contact terminal comprises limit switches 32a through 32f, hub 28, cam 31, and rotary switch 24 plus the accompanying components and electrical connections. Each of the limit switches has a pair of normally closed contacts 34 and 35, as shown, that are opened when cam 31 engages the corresponding limit switch shaft and roller assembly 38 to move the shaft and roller assembly to open the contacts, as schematically shown in FIG. 6.

A motor control means for connecting an alternating current electrical power source 40 to the motor is controlled by the sensing means and by the switch means with switch 24 connecting electrical power along a conductor C through contact 24m to any of contact positions 24a through 24f. The switch means also comprises a means for determining direction of rotation comprises the connections of the rotary switch to the limit switches and the interconnections of the limit switches and several control relays which include a reverse control relay 41 with normally closed contacts 41a, 41b and 41d, and normally open contact 41c; and a forward control relay 42 with normally closed contacts 42a, 42b and 42d, and normally open contact 42c. A timing or time delay means for controlling the time interval of closing after deenergization comprises contacts 41b, 41c, 41d, 42b, 42c and 42d and any suitable time delay relay device for controlling contact movement. Control relays 41 and 42 operate to control reverse relay 43 and forward relay 44, which have four contacts each, with reverse relay 43 having normally open contacts 43a, 43b and 43c, and normally closed contact 43d, and forward relay 44 having normally open contacts 44a, 44b and 44c and normally closed contact 44d. Contacts 41b and 42b have a time delay operational interval long enough to insure that switching and rotation to the selected position will be completed even if rotary switch 24 is moved during the time the contactor is rotating.

Motor 25 comprises a starting winding 46 controlled by a centrifugal switch 47 and a running winding 48 in a manner known in the art. An overload control heater 49 is connected in the motor circuit and comprises normally closed contacts 49a and 49b.

A load control system 50 is connected into the electrical power system to provide for removal of electrical power from the rotary switch when it is moving between contact positions. Control system 50 is connected in series with switch contacts 41d, 42d and overload safety switch 49b to produce an output at 50A when the rotary tap changer is being rotated. The deenergization of the rotary tap changer is accomplished in any manner known in the art (not shown) in response to the output of 50A that occurs when control 50 is de-energized by the open position of any of switches 41d, 42d and 49b.

A dynamic braking means comprises an energy storage device such as a capacitor 51, a resistor 52 for limiting instantaneous current to capacitor 51, a diode 53 for rectifying the alternating current from source 40 to capacitor 51, and a bi-directional voltage limiting device 54 for by-passing high voltage peaks around motor 25, and a switching means for connecting the energy storage device across the motor which includes contacts 43d and 44d.

In the operation of the rotary tap changer and control system shown, referring particularly to FIG. 6, rotary switch 24 is shown in the position that it was last placed in and after which the contactors have moved to a position corresponding to the position shown, i.e., the position 24b which corresponds to limit switch 32b. In this position cam 31 holds limit switch 32b in an open position and contactors 12a, 12b and 12c are in contacting position with contact terminals 14b, 15b and 16b, respectively. At this position the circuit from energy source 40 is broken by the open condition of limit switch 32b and the relays, motor, and other portions of the circuit are not energized.

Assuming the condition related, to move the contactors to a position wherein contactors 12a, 12b and 12c are placed in contact with contact terminals 14a, 15a and 16a, respectively, rotary switch 24 would be moved (from the position shown in FIG. 6,) to the position connecting contact 24m to contact 24a. Upon the movement of the rotary switch to this position, power source 40 is connected along conductor C to contact 24m and thereby to contact 24a, to closed contacts 35 in limit switch 32a, and from the other side of contacts 35 to the upper contacts 34 of both limit switches 32a and 32b. Since limit switch 32b is in an open position the only current path available is through contacts 34 of limit switch 32a, normally closed contact 42a of relay 42 and relay 41 to power source 40. The energization of relay 41 opens contact 41a, which has no effect since no electrical power is applied to contact 41a; opens contact 41b, which has no effect since contact 42c is open; closes contact 41c, which energizes reverse relay 43 because contact 42b remains in its closed condition when relay 42 is not energized; and opens contact 41d, which de-energizes control system 50 to produce an output at 50a that disconnects the electrical power source from the rotary switch in any manner known in the art as discussed above.

The energization of reverse relay 43 is accomplished from power source 40 through the now closed contact 41c, the normally closed contact 42b, and the normally closed contact 49a. This closes contacts 43a, 43b and 43c and opens contact 43d. This energizes the run and start windings of motor 25 as current flows through closed contact 43a, overload relay 49, start winding 46, and centrifugal switch 47 to place the motor in a start mode. The running winding is energized in the reverse rotation direction (counter-clockwise as viewed in FIG. 5) through closed contact 43a, overload relay 49, and closed contacts 43b and 43c. When the motor has reached operational speed, centrifugal switch 47 is opened in a manner known in the art to place motor 25 in its running mode in the reverse direction.

The opening of contact 43d, which is normally closed, upon the energization of forward relay 43 charges capacitor 51 to a pre-selected level during the time the motor is energized as electrical current from current source 40 flows along conductor C through closed contacts 43c, resistor 52, diode 53, capacitor 51, contact 43b, heater coil 49, and closed contact 43a to power source 40.

The motor rotates in the reverse direction until cam 31 engages limit switch 32a to open its contacts 34 and 35. When contacts 34 and 35 open, energization is removed from relay 41. This closes contact 41a, which has no effect since no electrical energy is available at contact 41a; opens contact 41b, which has no effect since contact 42c is open; starts the timing to open time delay contact 41c after the selected time interval to de-energize reverse relay 43; and closes contact 41d after a selected time interval selected to be longer than the closing time interval of contact 41c. The opening of contact 41c de-energizes relay 43 to open contacts 43a, 43b and 43c and close contact 43d. The opening of contacts 43a, 43b and 43c removes energization from the motor and the closing of contact 43d connects capacitor 51 across motor run winding 40a through contacts 43d and 44d. The discharge of capacitor 51 through motor winding 48 instantaneously stops motor 25 with a dynamic braking effect by applying the current in a direction opposing the motion of the motor rotor.

The same conditions occur in the same general manner if the rotary tap changer is moved to any position in a forward or reverse direction. Cam 31 has a configuration adapted to open the limit switches in advance of the contact position and is substantially symmetrical so that it functions in either direction.

The disconnection from the electrical current being controlled by the tap changers is accomplished by control circuit 50 upon the opening of any one of contacts 41d, 42d and 49d. All three of these contacts have time delayed closing to insure that the contactor has reached the selected position before the changer is again energized. Overload relay 49 functions in the event that overheating of the motor occurs to open contact 49a and 49b to de-energize the tap changer and to de-energize any of the relays that are energized.

When the selection of a new position is selected by movement of switch 24, the tap changer will usually be rotated in a direction that will be the shorter rotational distance from its start position except when the shorter distance would take it through 15a to 15f or the reverse. An example of this is shown if, with limit switch 32b open and the tap changer in position as indicated by FIG. 6, switch 24 is moved to position 24d, the position controlled by limit switch 32d. This connects contact terminal 24m to terminal 24d and current flows through lower contact 35 of limit switch 32d and is applied to upper contacts 34 between limit switches 32d and 32e. Since limit switch 32b is open, no current flows through limit switch 32d, but instead is applied through contacts 34 of limit switches 32e and 32f to the forward relay arrangement by energizing forward relay 42. The energization of forward relay 44 rotates the motor in the forward direction (clockwise as viewed in FIG. 5) because of the energization of run winding 48 of motor 25 in a different polarity relationship. However, if the contactor is at a position selected by switch position 24f and the switch is moved to 24a, the rotation will be in the longer direction. This is desirable in situations such as transformer tap changers, to move the contactors through smaller voltage increments if a control system such as control system 50 fails or is not considered necessary.

The operational timing intervals of contacts 42b and 41b provide a means for stopping the contactors at a full contact position with the contact terminals. To adjust the timing sequence the motor is rotated by rotation of rotary switch 24 to rotate the motor in the desired direction. The timing of the opening of the contact after de-energization of its relay is adjusted to stop the contactors at the proper position. Since the characteristics of rotation of the motor are substantially the same, and will generally remain so, in one direction it is only necessary to have an adjustment in a forward direction and an adjustment in the reverse direction. Therefore in normal applications in installation the timing adjustments of relay contacts 41b and 42b would be made once for forward rotation and once for reverse rotation and the stopping of the contactors would be satisfactory for all normally experienced conditions.

We claim:

1. A rotary tap changer having a shaft rotatable about an axis, a plurality of contact terminals at respective contact positions, a contactor on said shaft positioned to engage a contact terminal at said contact positions, a motor adapted to be connected to a source of electrical energy to rotate the shaft for sequentially engaging said contactor with each contact terminal comprising:

a selector switch means operable to any one of a plurality of positions for selecting a respective one of said contact terminal positions for the contactor,
    a motor control means operable for connecting the motor to said electrical power source and operable for disconnecting said motor from said electrical power source,
    a plurality of spaced limit switches each spaced in correspondence with a respective one of said contact terminal positions effective in response to the operation of said selector switch means for operating said control means to rotate the shaft for enabling the respective one of said spaced switches to produce an indication signal when the contactor is at a selected distance from a selected contact terminal position for operating said motor control means to disconnect said motor from said source, and
    an electrical energy storage device connected to be discharged across the motor to stop rotation of the motor and shaft in response to the operation of said motor control means for disconnecting said motor from said electrical power source.

2. A rotary tap changer according to claim 1 in which said motor control means comprises a time delay means responsive to the indication signal to operate after a selected time interval to disconnect the motor from the power source and to connect the storage device across the motor.

3. A rotary tap changer according to claim 2 including a cam connected to rotate with the shaft and shaped for operating each of said plurality of limit switches in sequence prior to the full engagement of said contactor with a respective one of said terminals.

4. A rotary tap changer according to claim 3 wherein said motor is adapted to rotate said shaft in either of two directions and said plurality of limit switches are each positioned to be respectively opened in sequence by the cam at the selected distance of the contactor from the contact terminal position corresponding to said respective limit switch.

5. A rotary tap changer according to claim 4 interconnecting said selector switch means and said plurality of limit switches for controlling the direction of rotation of the motor and shaft.

6. A rotary tap changer according to claim 5 wherein the time delay means comprises an adjustable time delay relay for each direction of shaft rotation and respectively operable in accordance with the direction of shaft rotation to de-energize the motor and discharge the energy source after a respective selected time interval.

7. A rotary tap changer according to claim 5 wherein said means for controlling the direction of shaft rotation includes a serial connection through said plurality of limit switches selected in accordance with the relationship between the position of said selector switch means and a previously operated one of said plurality of switches.

8. A rotary tap changer according to claim 7 wherein said plurality of limit switches are each positioned to be opened by the cam at the selected distance of the contactor from the selected contact terminal position corresponding to said respective limit switch in response to rotation of said shaft in either direction.

9. A rotary tap changer according to claim 1 wherein said energy storage device comprises a capacitor connected to store an electrical charge at a preselected level.

10. A rotary tap changer according to claim 9 wherein the energy storage device comprises a charging circuit for charging the capacitor when the motor is energized and a means for connecting the capacitor to discharge across the motor when the motor is de-energized.

11. A rotary tap changer having a shaft rotatable about an axis, a plurality of contact terminals at respective contact positions, a contactor on said shaft positioned to engage a contact terminal at said contact positions, a motor connected to rotate the shaft, and a means for controlling positioning of said contactor at said respective contact terminal positions comprising:
- a switch means for selecting a contact terminal position for the contactor,
- a motor control means for connecting the motor to and disconnecting it from an electrical power source,
- a sensing means operable when the shaft is rotating for producing an indication signal when the contactor is at a selected distance from a selected contact terminal position,
- an electrical energy storage device,
- a switching means for connecting the storage device to be discharged across the motor to stop rotation of the motor and shaft
- a time delay means responsive to the indication signal of the sensing means to cause operation after a selected time interval of the motor control to disconnect the motor from the power source and of the switching means to connect the storage device across the motor,
- said sensing means comprising a cam connected to rotate with the shaft, and a plurality of limit switches one for each respective contact terminal position connected to be moved by the cam,
- said limit switches each positioned to be respectively opened by the cam at the selected distance of the contactor from the contact terminal position corresponding to said respective limit switch,
- said switch means comprising a selector switch and electrical connections that connect a selected one of the limit switches to the power source, and a means for determining the direction of the motor,
- said time delay means comprising an adjustable time delay relay responsive to the operation of a selected limit switch to de-energize the motor and discharge the energy source after a selected time after the opening of the limit switch, and
- wherein the sensing means comprises two time delay relays respectively operable in each of the two directions of rotation, and a cam having a configuration adapted to open the limit switches in each direction of rotation at a predetermined distance of the contactor from the selected contact position.

12. A rotary tap changer according to claim 11 wherein said energy storage device comprises a capacitor connected to store an electrical charge at a preselected level.

13. A rotary tap changer according to claim 12 wherein the energy storage device comprises a charging circuit for charging the capacitor when the motor is energized and a means for connecting the capacitor to discharge across the motor when the motor is, de-energized.

14. A rotary tap changer according to claim 13 wherein said cam operates to move the limit switches to an open condition of each contact terminal position.

15. A rotary tap changer according to claim 14 wherein said time delay means comprises means for varying the time delay interval individually for the forward and reverse direction of rotation.

16. A rotary tap changer having a shaft rotatable about an axis, a plurality of contact terminals at respective contact positions, a contactor on said shaft positioned to engage a contact terminal at said contact positions, a motor connected to rotate the shaft, and a means for controlling positioning of said contactor at said respective contact terminal positions comprising:
- a switch means for selecting a contact terminal position for the contactor,
- a motor control means for connecting the motor to and disconnecting it from an electrical power source,
- a sensing means operable when the shaft is rotating for producing an indication signal when the contactor is at a selected distance from a selected contact terminal position,
- an electrical energy storage device,
- a switching means for connecting the storage device to be discharged across the motor to stop rotation of the motor and shaft,
- a time delay means responsive to the indication signal of the sensing means to cause operation after a selected time interval of the motor control to disconnect the motor from the power source and of the switching means to connect the storage device across the motor,
- said sensing means comprising a cam connected to rotate with the shaft and plurality of limit switches one for each respective contact terminal position connected to be moved by the cam, said limit switches positioned to be opened by the cam at the selected distance of the contactor from the selected contact terminal position corresponding to said respective limit switch, and
- wherein the selector switch means and sensing means comprises a selector switch and electrical connections that connect a selected one of the limit switches to the power source, and a means for connecting the power source through selected other limit switches to thereby determine the direction of rotation of the motor.

17. A rotary tap changer according to claim 16 wherein the time delay means comprises an adjustable time delay relay responsive to the opening of a limit switch to de-energize the motor and discharge the energy source after a selected time after the opening of the limit switch.

18. A rotary tap changer according to claim 17 wherein the sensing means comprises two time delay relays respectively, operable in each of the two directions of rotation, and a cam having a configuration adapted to open the limit switches in each direction of rotation at a predetermined distance of the contactor from the selected contact position.

19. A rotary tap changer having a shaft rotatable about an axis, a plurality of contact terminals at respective contact positions, a contactor on said shaft positioned to engage a contact terminal at said contact positions, a motor connected to rotate the shaft, and a means for controlling positioning of said contactor at said respective contact terminal positions comprising:
- a switch means for selecting a contact terminal position for the contactor,
- a motor control means for connecting the motor to and disconnecting it from an electrical power source,
- a sensing means operable when the shaft is rotating for producing an indication signal when the contactor is at a selected distance from a selected contact terminal position,
- an electrical energy storage device,
- a switching means for connecting the storage device to be discharged across the motor to stop rotation of the motor and shaft, a time delay means responsive to the indication signal of the sensing means to cause operation after a selected time interval of the motor control to disconnect the motor from the power source and of the switching means to connect the storage device across the motor, said cam operates to move the limit switches to an open condition of each contact terminal position, said time delay means comprises an adjustable time delay relay responsive to the operation of a selected limit switch to deenergize the motor and discharge the energy source after a selected time after the opening of the limit switch, and wherein said time delay means comprises means for varying the time delay interval individually for the forward and reverse direction of rotation.

20. A rotary tap changer according to claim 19 wherein said energy storage device comprises a capacitor connected to store an electrical charge at a preselected level.

* * * * *

UNITED STATES PATENT AND TRADEMARK OFFICE
CERTIFICATE OF CORRECTION

PATENT NO. : 4,079,299

DATED : March 14, 1978

INVENTOR(S) : D. L. Swindler and B. O. Brooks

It is certified that error appears in the above-identified patent and that said Letters Patent are hereby corrected as shown below:

Col. 2, line 23, change "an" to --and--.

Col. 6, line 31, insert --including means for-- after Claim 4.

Col. 7, line 53, delete "," before de-energized.

Signed and Sealed this

Twenty-sixth Day of August 1980

[SEAL]

Attest:

SIDNEY A. DIAMOND

Attesting Officer    Commissioner of Patents and Trademarks